Sept. 14, 1954   W. J. HUSHLEY   2,689,190
FLUORESCENT SCREEN AND METHOD FOR FORMING SAME
Filed Dec. 5, 1951
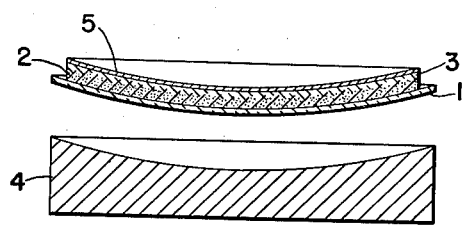
WITNESSES:
John E. Hushley
Leon M. Garman
INVENTOR
Walter J. Hushley
BY
F. E. Browder
ATTORNEY Patented Sept. 14, 1954

2,689,190

UNITED STATES PATENT OFFICE 2,689,190

FLUORESCENT SCREEN AND METHOD FOR FORMING SAME

Walter J. Hushley, Pittsburgh, Pa., assignor to Westinghouse Electric Corporation, East Pittsburgh, Pa., a corporation of Pennsylvania Application December 5, 1951, Serial No. 260,007

6 Claims. (Cl. 117—33.5)

My invention relates to fluorescent screen and in particular relates to a fluorescent screen, and a process for making the same, in which the crystals of fluorescent material form a layer which is separated from a close-lying ancillary layer of other material by an exceedingly thin septum of glass. A specific instance of such a screen used in an X-ray image intensifier of the general type described in Hunter and Longini's U. S. Patent 2,555,545 in which a layer of photoelectric material covers one side of a thin glass partition which is coated on the other side with a thin layer of zinc sulphide. However, the structure and process herein described may find many uses in optical arrangements quite different from X-ray image intensifiers since they are generally useful in situations where fluorescent and other materials are required to be isolated from their environments by thin glass or similar partitions.

In order that fine details shall be clear in the light image, generated by X-ray or other radiations in a fluorescent screen, it is necessary that the particles deposited to form the latter shall be minute in size; for instance those zinc sulphide particles being used in an X-ray image intensifier now being put on the market by applicant's assignee are from 10 to 40 microns in diameter, and the layer of these deposited is a few hundredths of an inch thick. It is desired to position a thin layer of photo-electric material, e. g. cesiated antimony, as closely as possible to this phosphor layer, so that the light image, generated by X-ray impact, point-by-point over the surface of the zinc-sulphide layer, shall produce a corresponding point-by-point emission of electrons from the contiguous surface of the photo-electric layer. To get the exact correspondence in point-by-point distribution of the electron-emission to the light generated which is needed to reproduce details accurately it is necessary that the photo-electric layer be very close indeed to the phosphor layer. However, a clear separation of the two layers is necessary since the cesium vapor emitted by the photo-electric material chemically attacks the zinc-sulphide phosphor and rapidly ruins its fluorescent properties. Moreover, a thin electrically conductive backing is required for operational purposes to underlie the photo-electric material. In short, it is necessary to isolate the zinc-sulphide layer from its environment by a very thin septum of a material which is transparent to the fluorescent light and chemically inert to the zinc-sulphide, the cesiated antimony and the electrically conductive interlayer, which will not deteriorate a high-vacuum, and which can be formed without heating the phosphor to an injurious temperature. Certain glasses which I describe herein are capable of forming such an isolating partition.

In my application Serial No. 101,964, filed on or about June 29, 1949, and assigned to Westinghouse Electric Corporation of East Pittsburgh, Pa., I have described a fluorescent screen in which close spacing of phosphor particles from a photo-electric layer is attained by mingling the phosphor particles with glass particles to form the surface layer of a glass plate, and depositing cesiated antimony upon the latter. While this arrangement is satisfactory for many purposes the amount of glass disposed through the phosphor is usually almost equal in weight per unit area to the phosphor; e. g. with 60 mg. of zinc-sulphide on each square centimeter of screen surface there is usually mingled 55 mg. of glass. This glass between the zinc-sulphide crystals perceptibly reduces the light output to the photo-electric layer and likewise decreases the resolving power of the screen for fine detail in the pictures it reproduces.

In my application Serial No. 260,006, filed December 5, 1951, and assigned to the above-named corporation, I describe a fluorescent screen in which a glass plate some 6 inches in diameter of the least thickness that seems practicable, i. e. about 0.006 inch is coated on opposite sides respectively with a phosphor and a photo-electric layer. In this case about 45 mg. of glass would intervene in each square centimeter of screen area between the phosphor and the photo-electric layer. If screens are made as I am about to describe herein, the amount of glass between the phosphor layer and the photo-electric layer is reduced to about 20 mg. of each square centimeter of screen area. This screen has accordingly a very high electron output for a given thickness of fluorescent material and a high resolving power for detail.

One object of my invention is accordingly to produce a screen comprising an extended layer of fluorescent material covered by a very thin layer of glass.

Another object of my invention is to provide a method by which a thin extended layer made up of fine crystals of fluorescent material may be given a very thin impervious covering of transparent material which is relatively inert chemically and stable under the conditions met with in high vacuum apparatus.

Still another object is to provide a fluorescent screen, and method of making it, in which a fluorescent layer is separated from a photoemissive layer by an extremely thin partition of isolating material.

Yet another object is to provide a method of forming a screen for image intensifiers in which an extended layer of zinc-sulphide is separated from a layer of cesiated antimony by a septum of fused glass.

A further object of my invention is to provide a screen for causing a radiation field to generate a correspondingly distributed electron-image which is of high intensity and resolving power for detail.

Other objects of my invention will become apparent in reading the following description taken in connection with the drawings in which the single figure is a side view, partly in section, of a screen made in accordance with my invention.

Turning in detail to the drawings a plate 1 which may be of soda-lime glass about 0.04 inch thick is coated on one face as described below with a layer 2 of suitable fluorescent material such as zinc-sulphide. According to one desirable modification of my invention the glass plate 1 may have the form of six inch diameter segment cut from the surface of a sphere of 10½ inch radius. One convenient method of applying the coating 2 is to place the plate, concave side up in the bottom of a container three to ten inches deep filled with a potassium silicate solution. A measured quantity of phosphor powder is then sprinkled uniformly onto the disc through the solution. It is usually desirable to add a small quantity of a surface active or wetting agent to the solution to prevent the phosphor powder from floating on the surface. If the setting solution is quite deep, for example, ten inches, it is not necessary to sprinkle very uniformly. Alternatively, the phosphor powder may be suspended in an additional small quantity of the silicate solution and added to the bulk solution. The bulk solution disperses the powder as it settles and makes the deposit more uniform.

A suitable potassium silicate solution is one containing about six per cent by weight of potassium silicate in water but this concentration may be increased or decreased by a factor of two without affecting its usefulness a great deal. The preferred form of potassium silicate is one in which the ratio of silica to potassium oxide is about two and a half by weight. For image intensifier purposes the weight of zinc-sulphide phosphor is from 50 to 100 but preferably about 70 mg./cm.$^2$. Instead of zinc-sulphide other phosphors which may be used are cadmium tungstate, calcium tungstate and barium lead sulfate. The preferred size of the phosphor powder particles is that normally used for X-ray screens or about ten to forty microns. It is believed that any inorganic phosphor could be used provided it could be heated to about 650° C. for about an hour without substantial deterioration. Instead of potassium silicate one could use a sodium silicate solution.

When the phosphor has settled onto the glass disc, the silicate solution is removed by draining or siphoning and the phosphor layer is dried slowly. When it appears dry it is heated for a few minutes at about 400° C. to drive out the moisture from the silicate binder.

A thin layer of glass powder 3 is next deposited on the phosphor layer. The glass powder is made from specially prepared low melting glass, ground to pass a sieve of 200 meshes per inch. Glasses having compositions described in my patent application Serial No. 200,367, filed December 12, 1950, and entitled "Glass for Embedding Zinc Sulphide Phosphors" are suitable. However, the following more restricted range of compositions is generally used.

(a) Boric oxide $B_2O_3$, 60 to 75 per cent by weight,
(b) Silica, $SiO_2$, 15 to 25 per cent by weight,
(c) Alumina, $Al_2O_3$, 1 to 4 per cent by weight,
(d) Magnesia, MgO, 1 to 3 per cent by weight,
(e) Oxides of sodium, potassium and lithium, 7 to 15 per cent by weight, with sodium oxide forming about one half and potassium and lithium oxides each about one quarter of the alkali oxide content.

The following specific formula is preferred.

(a) Boric oxide, 67 per cent by weight,
(b) Silica, 20 per cent by weight,
(c) Alumina, 2 per cent by weight,
(d) Magnesia, 2 per cent by weight,
(e) Sodium oxide, 5 per cent by weight,
(f) Potassium oxide, 2 per cent by weight,
(g) Lithium oxide, 2 per cent by weight.

The glass powder is deposited to a weight thickness of 15 to 25 mg./cm.$^2$ but preferably 20 mg./cm.$^2$. The powder may be suspended in a liquid such as carbon tetrachloride, trichloroethylene or ether and either sprinkled or flowed onto the phosphor layer. The liquid evaporates and leaves the glass powder more densely packed than if the powder had been sprinkled dry so that it is unnecessary to smooth the powder surface any further. Use of the suspending liquid for applying the glass powder layer is generally preferred particularly if the phosphor layer is not smooth and flat. Most common organic solvents dissolve the boric oxide in the glass to a slight extent and so do not evaporate completely enough. If the glass is heated to the temperature at which it flows, the organic compounds remaining in it cause a grey opalescence. However, the three liquids mentioned above do not noticeably affect the glass.

The screen coated with glass powder is now placed on an iron mold (4 in the drawing) having a concave upper surface of the desired curvature. The iron mold should be preheated to about 200° C., before the glass plate is put on it to prevent the glass plate from cracking. The assembly is then heated in an oven slowly to about 650° C. and held there for about an hour. At this temperature the surface glass melts and flows to a reasonably smooth glass layer on the surface of the phosphor layer. It is desirable that the oven have a neutral atmosphere such as nitrogen.

Upon removal from the oven the surface is sprayed with a solution of tin chloride to give a transparent electrically conducting layer 5 on the glass. The tin chloride solution may consist of approximately equal parts of anhydrous tin chloride, acetic acid and methanol but other solutions may also be used. The resistance desired in this layer is any value less than one megohm per square and it is not critical.

In the above described procedure it is possible to use glass powders which are fluid enough at 600° C., to flow to smoothness on the surface. The lower temperature is desirable since it reduces the deterioration suffered by sulfide-type phosphors when they are heated excessively. Also if contaminants are present they are less harmful at lower temperatures.

As an alternative to the foregoing method it is possible to start with the glass plate in the form of a flat circular disc of soda-lime glass six inches in diameter by 0.04 inch thick. In such case the phosphor coating and the powdered glass are deposited in the manner already described. When the glass disc is heated on the iron mold to about 650° C. the glass disc sags to the shape of the mold surface and thereafter behaves in the same manner, as has been already described for the preformed plate first mentioned.

It is probable that when the powdered glass fuses together in the above described procedure it does not penetrate and completely fill the voids between the phosphor particles but stretches or loops from one to another, leaving a reasonably smooth glassy outer surface on which the tin chloride and cesiated antimony are laid down.

After the above described steps have been carried out a layer of photo-electrically-emissive material such as cesiated antimony may be deposited by methods now known in the art on the surface coated with tin chloride solution. While the screen used in the above-mentioned image intensifier is provided with such a photo-emissive layer, the screen has utility in certain other fields even though either or both the photo-electric and the tin-chloride applications are omitted.

I claim as my invention:

1. A screen comprising a backing plate, a layer of zinc sulphide bound to said plate with an alkali silicate, and a thin fused layer in amount of 15 to 25 milligrams per square centimeter consisting of the fired mixture consisting by weight essentially of 60% to 75% $B_2O_3$, 15% to 25% $SiO_2$, 1% to 4% $Al_2O_3$, 1% to 3% MgO and 7% to 15% of oxides of the alkali metals sodium, potassium and lithium, with sodium oxide forming about one-half, and potassium oxide and lithium oxide each about one quarter of said alkali oxides.

2. A fluorescent screen which consists essentially of a backing plate with a layer of a fluorescent material selected from the group consisting of cadmium tungstate, calcium tungstate, barium-lead-sulphate and zinc sulphide and, on the surface of said layer, a thin layer of powdered glass formed by firing a mixture consisting by weight essentially of 60% to 70% $B_2O_3$, 15% to 25% $SiO_2$, 1% to 4% $Al_2O_3$, 1% to 3% MgO, and 7% to 15% of oxides of the alkali metals sodium, potassium and lithium, with sodium oxide forming about one-half, and potassium oxide and lithium oxide each about one quarter of said alkali oxide.

3. The method of forming a fluorescent screen which consists essentially of coating a backing plate with a layer of a fluorescent material having a melting point above 650° C., settling on the surface of said layer through a liquid selected from the group which consists of carbon tetrachloride, trichloroethylene and ether a thin layer of powdered glass formed by firing a mixture consisting by weight essentially of 60% to 70% $B_2O_3$, 15% to 25% $SiO_2$, 1% to 4% $Al_2O_3$, 1% to 3% MgO, and 7% to 15% of oxides of the alkali metals sodium, potassium and lithium, with sodium oxide forming about one-half, and potassium oxide and lithium oxide each about one quarter of said alkali oxides, and heating the resulting structure to about 600° C. in an atmosphere which is chemically inert to said plate and said layers.

4. The method of forming a fluorescent screen which comprises essentially of coating a backing plate with a layer of a fluorescent material selected from the group consisting of cadmium tungstate, calcium tungstate, barium-lead-sulphate and zinc sulphide, depositing on the surface of said layer a thin layer of powdered glass formed by firing a mixture consisting by weight essentially of 60% to 70% $B_2O_3$, 15% to 25% $SiO_2$, 1% to 4% $Al_2O_3$, 1% to 3% MgO, and 7% to 15% of oxides of the alkali metals sodium, potassium and lithium, with sodium oxide forming about one-half, and potassium oxide and lithium oxide each about one quarter of said alkali oxides, and heating the resulting structure to about 600° C. in an atmosphere which is chemically inert to said plate and said layers for about one hour.

5. The method of forming a fluorescent screen which consists essentially of coating a backing plate with a layer of a fluorescent material having a melting point above 650° C., settling on the surface of said layer through a liquid a thin layer of powdered glass formed by firing a mixture consisting essentially of 60% to 70% $B_2O_3$, 15% to 25% $SiO_2$, 1% to 4% $Al_2O_3$, 1% to 3% MgO, and 7% to 15% of oxides of the alkali metals sodium, potassium and lithium, with sodium oxide forming about one-half, and potassium oxide and lithium oxide each about one quarter of said alkali oxides, and heating the resulting structure to about 600° C. in an atmosphere which is chemically inert to said plate and said layers.

6. The method of forming a fluorescent screen which consists essentially of coating a backing plate with a layer of a fluorescent material having a melting point above 650° C., settling on the surface of said layer through a liquid drawn from the group which consists essentially of carbon tetrachloride, trichloroethylene and ether a thin layer in an amount of 15 to 25 milligrams per square centimeter of powdered glass formed by firing a mixture consisting essentially of 60% to 70% $B_2O_3$, 15% to 25% $SiO_2$, 1% to 4% $Al_2O_3$, 1% to 3% MgO, and 7% to 15% of oxides of the alkali metals sodium, potassium and lithium, with sodium oxide forming about one-half, and potassium oxide and lithium oxide each about one quarter of said alkali oxides, and heating the resulting structure to about 600° C. in an atmosphere of nitrogen for about one hour.

References Cited in the file of this patent

UNITED STATES PATENTS

| Number | Name | Date |
| --- | --- | --- |
| 2,094,630 | Winninghoff | Oct. 5, 1937 |
| 2,238,784 | Scott et al. | Apr. 15, 1941 |
| 2,573,200 | Hushley | Oct. 30, 1951 |

FOREIGN PATENTS

| Number | Country | Date |
| --- | --- | --- |
| 606,819 | Great Britain | Aug. 20, 1948 |